United States Patent
Kanayama et al.

(10) Patent No.: US 8,663,114 B2
(45) Date of Patent: Mar. 4, 2014

(54) ULTRASONIC DIAGNOSTIC APPARATUS AND STORAGE MEDIUM

(75) Inventors: Yuko Kanayama, Nasushiobara (JP); Naohisa Kamiyama, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 148 days.

(21) Appl. No.: 13/175,207

(22) Filed: Jul. 1, 2011

(65) Prior Publication Data

US 2012/0004553 A1    Jan. 5, 2012

(30) Foreign Application Priority Data

Jul. 2, 2010  (JP) .................. 2010-151987
Jun. 8, 2011  (JP) .................. 2011-128059

(51) Int. Cl.
*A61B 8/14*    (2006.01)

(52) U.S. Cl.
USPC ........... 600/443; 600/437; 600/439; 600/444; 600/447; 600/455; 382/131

(58) Field of Classification Search
USPC ........... 600/439, 455, 444, 443, 447; 382/131
See application file for complete search history.

(56) References Cited

U.S. PATENT DOCUMENTS

RE38,209 E  *  8/2003  Yamazaki et al. ............ 600/455
2009/0129651 A1*  5/2009  Zagzebski et al. ............ 382/131
2009/0149754 A1*  6/2009  Tsuda et al. .................. 600/439

FOREIGN PATENT DOCUMENTS

| JP | 2008-206779 | 9/2008 |
|---|---|---|
| JP | 2009-508552 | 3/2009 |
| JP | 2009-232947 | 10/2009 |
| WO | WO 2007/031818 A1 | 3/2007 |

OTHER PUBLICATIONS

Takafumi Hiro, et al., "Detection of Fibrous Cap in Atherosclerotic Plaque by Intravascular Ultrasound by Use of Color Mapping of Angle-Dependent Echo-Intensity Variation", Circulation Journal of the American Heart Association, Mar. 6, 2001, 7 pages.

* cited by examiner

*Primary Examiner* — Baisakhi Roy
(74) *Attorney, Agent, or Firm* — Oblon, Spivak, McClelland, Maier & Neustadt, L.L.P.

(57) ABSTRACT

The ultrasonic diagnostic apparatus according to the present embodiments includes an ultrasound transmitting and receiving unit, a tomographic image generating unit, an analyzing unit, and an analysis result display controller. The ultrasound transmitting and receiving unit is configured to transmit ultrasonic beams in multiple directions and is configured to receive echo signals of the multiple directions. The tomographic image generating unit is configured to generate a tomographic image in accordance with each of the directions of the ultrasonic beams. The analyzing unit is configured to compare echo signals of corresponding spatial positions in the tomographic images generated by the tomographic image generating unit with respect to each of the directions of the ultrasonic beams, and is configured to perform an analysis based on the comparison. The analysis result display controller is configured to display the analysis result obtained by the analyzing unit onto the displaying unit.

18 Claims, 18 Drawing Sheets

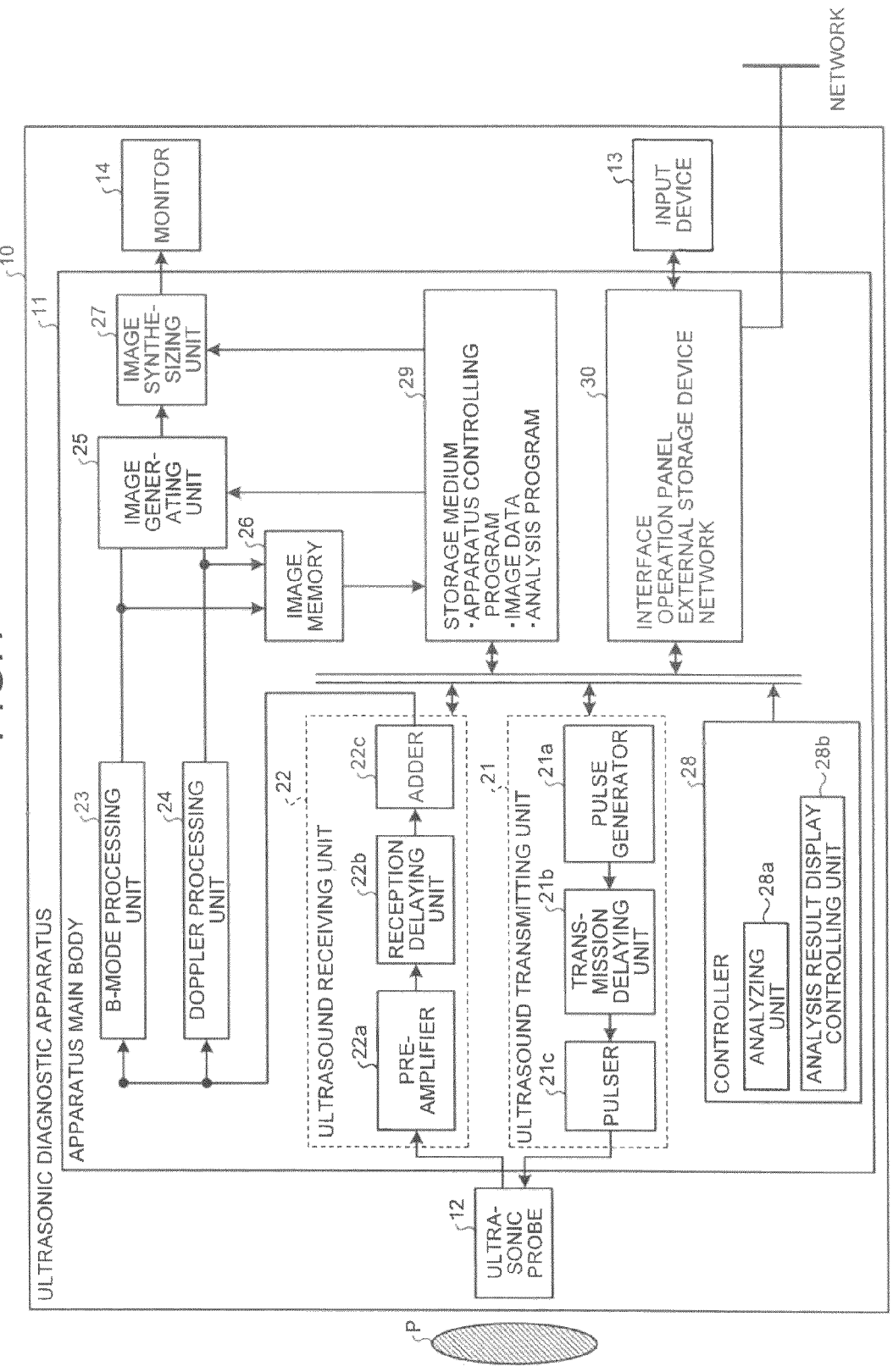

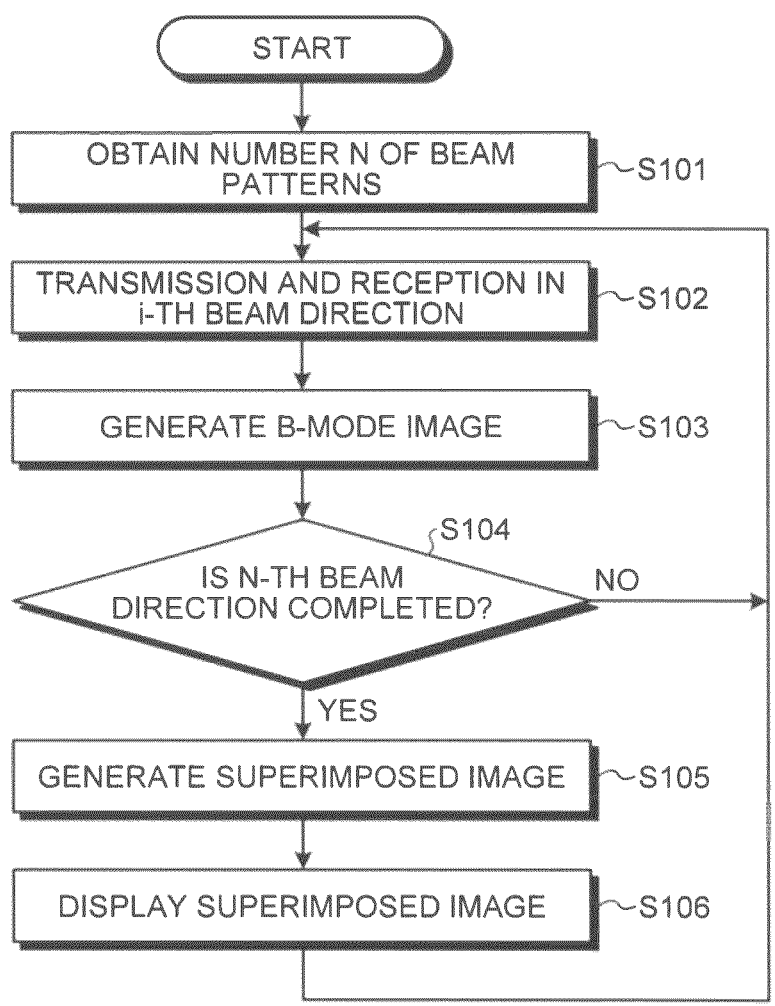

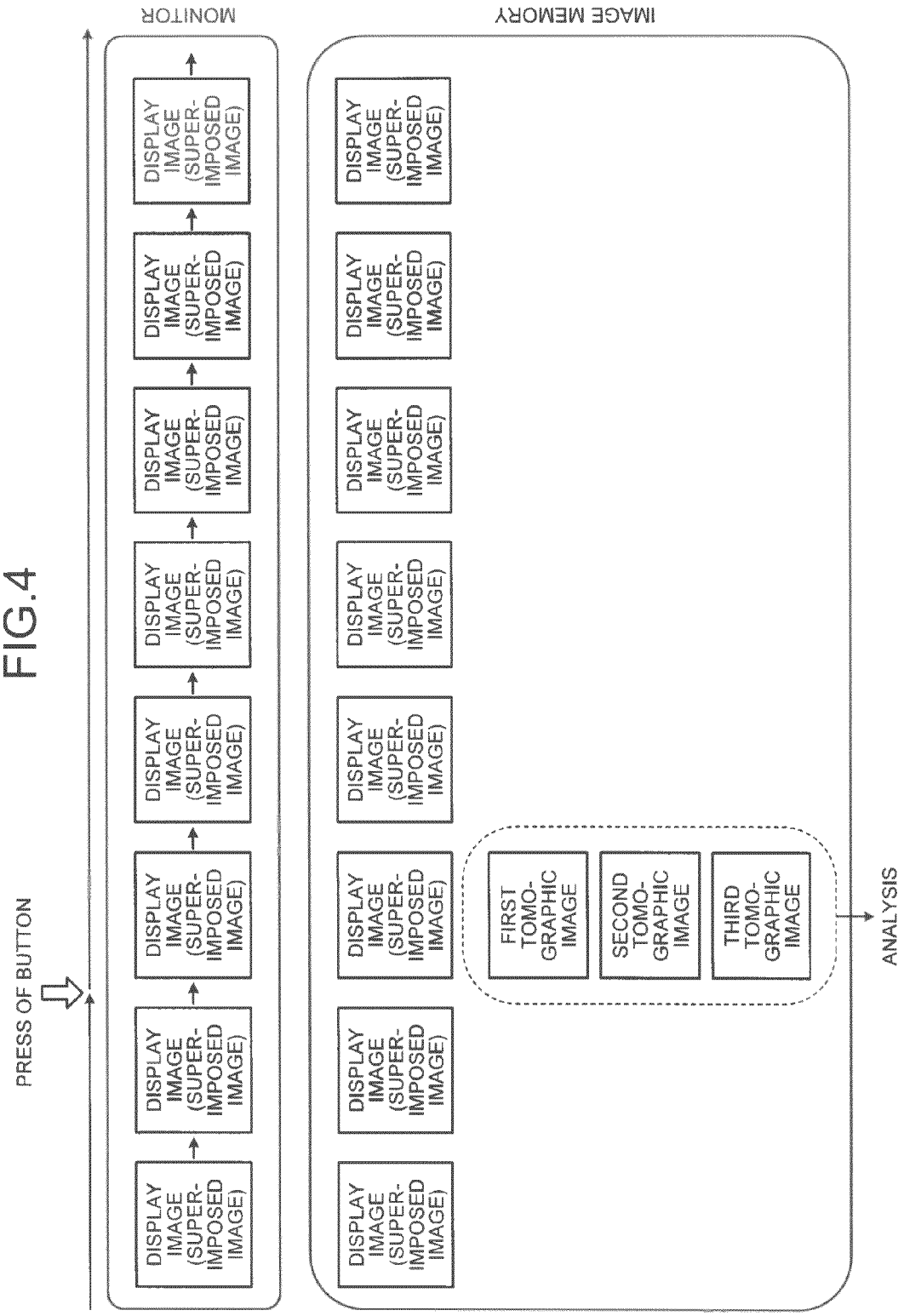

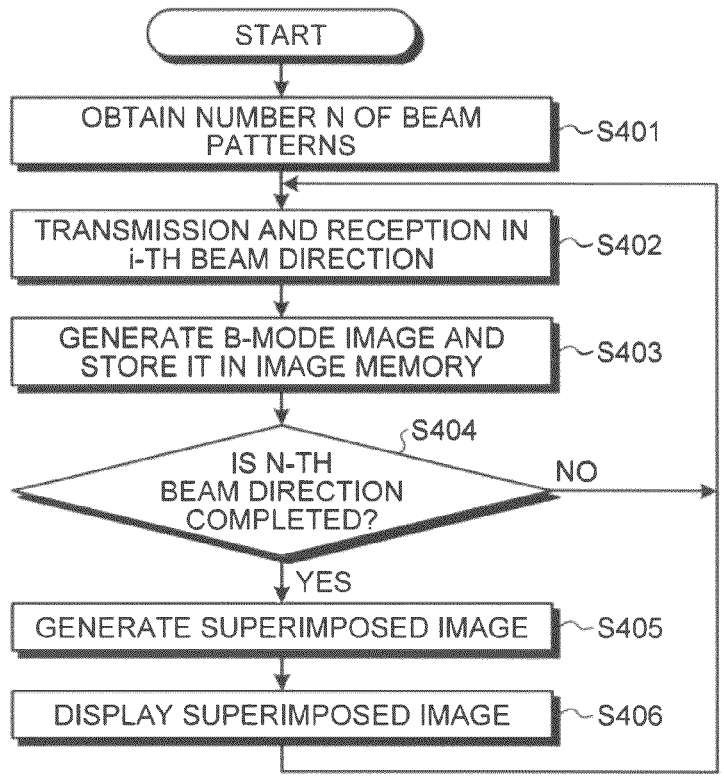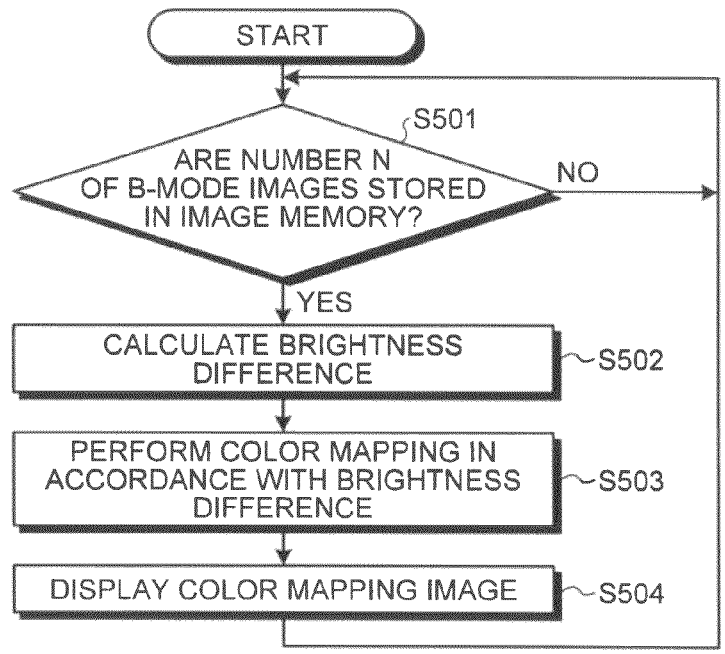

FIG.20
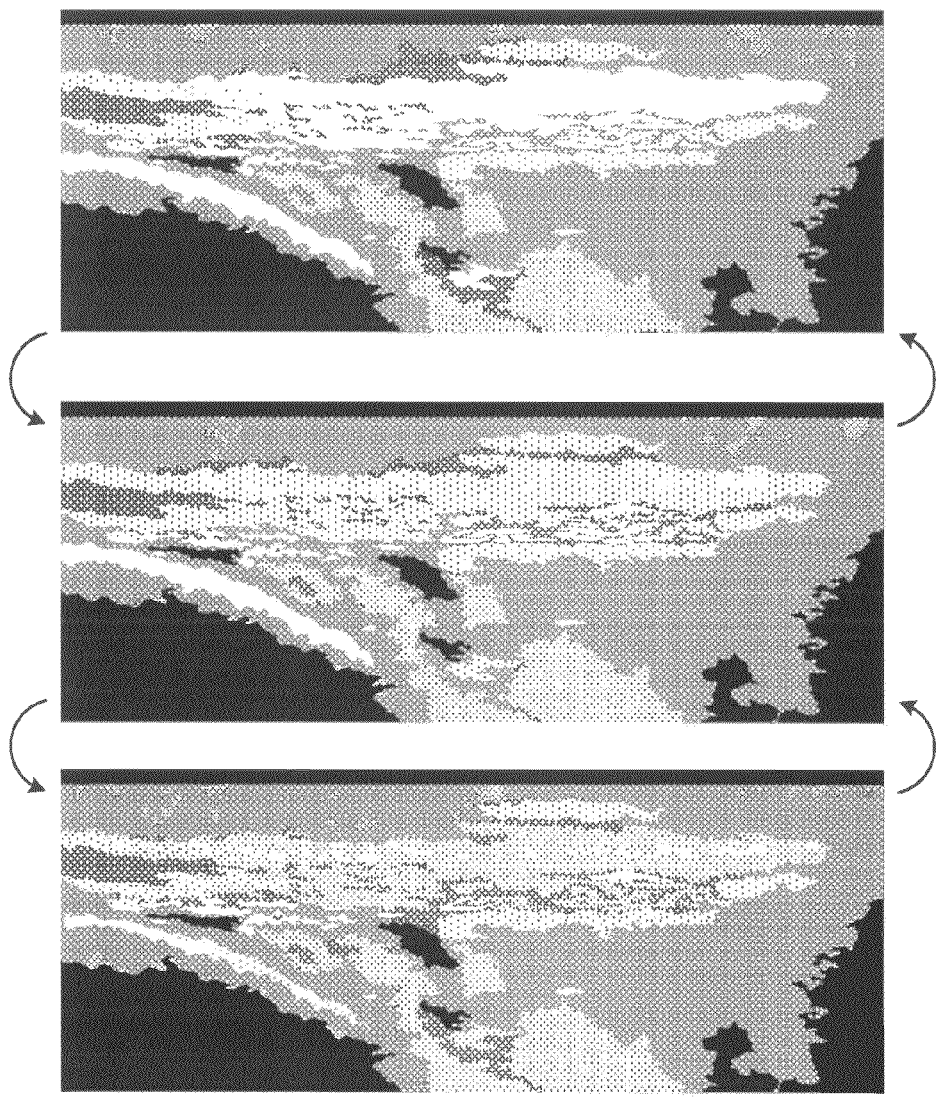
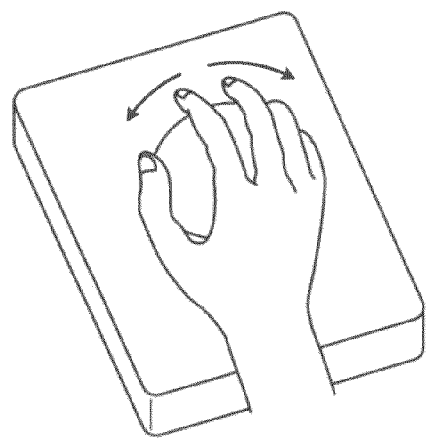

ULTRASONIC DIAGNOSTIC APPARATUS AND STORAGE MEDIUM

CROSS-REFERENCE TO RELATED APPLICATIONS

This application is based upon and claims the benefit of priority from Japanese Patent Application No. 2010-151987, filed on Jul. 2, 2010; and Japanese Patent Application No. 2011-128059, filed on Jun. 8, 2011, the entire contents of all of which are incorporated herein by reference.

FIELD

Embodiments described herein relate generally to an ultrasonic diagnostic apparatus and a storage medium.

BACKGROUND

Conventionally, an ultrasonic diagnostic apparatus is on a smaller scale than other medical imaging diagnostic apparatuses such as an X-ray diagnostic apparatus, an X-ray computed tomography (CT) apparatus, and a magnetic resonance imaging (MRI) apparatus. In addition, an ultrasonic diagnostic apparatus can display the movement of a test subject such as beating of the heart and fetal activity in real time, by a simple operation of placing an ultrasonic probe onto the surface of the body. For these reasons, the ultrasonic diagnostic apparatus plays an important role in the current medical field. Because there is no possibility of receiving radiation with the ultrasonic diagnostic apparatus, downsized apparatuses that are portable with one hand have been developed, and such ultrasonic diagnostic apparatuses can be readily used in medical practice such as obstetrics and home medical care.

Recently, as the resolution of ultrasonic images has been dramatically improved in accordance with the improvements of high-frequency probes and developments of image processing technology, the use of the ultrasonic diagnostic apparatus has been rapidly increased. For example, in the field of orthopedics, the subject of observation is soft tissue having a layered structure in which small fibers are gathered in a bundle, such as muscle and tendon, and the ultrasonic diagnostic apparatus can display this layered structure as an ultrasonic image. Thus, ultrasonic images are adopted as a useful means of clinical observation, and a doctor suspects of some abnormality if there is any loss or rupture of the layered structure observed in a ultrasonic image.

It is difficult, however, for an inexperienced person to discover such an abnormality in the ultrasonic image. In addition, if a smoothing process is performed on the ultrasonic image so as to make it easier to examine, useful clinical information may be lost. Because the examination of an ultrasonic image depends on the ability of the examiner, quantitative representation of the information displayed on the ultrasonic image has been demanded.

BRIEF DESCRIPTION OF THE DRAWINGS

FIG. 1 is a block diagram for showing the structure of an ultrasonic diagnostic apparatus according to a first embodiment;

FIG. 2 is a flowchart for showing the procedure of a process of displaying an ultrasonic image according to the first embodiment;

FIG. 4 is a diagram for explaining storage of tomographic images according to the first embodiment;

FIG. 16 is a flowchart for showing the procedure of a process of displaying an ultrasonic image according to the third embodiment;

FIG. 17 is a flowchart for showing the procedure of a process of conducting an analysis and displaying the analysis result according to the third embodiment;

FIG. 20 is a diagram for showing other example B-mode images displayed according to the fourth embodiment.

DETAILED DESCRIPTION

Figure 3A:
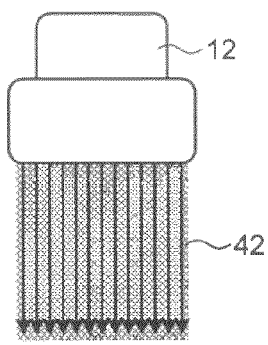
FIGS. 3A to 3D are diagrams for explaining the transmission directions of ultrasonic beams according to the first embodiment.

The ultrasonic diagnostic apparatus according to the present embodiments includes an ultrasound transmitting and receiving unit, a tomographic image generating unit, an analyzing unit, and an analysis result display controller. The ultrasound transmitting and receiving unit is configured to transmit ultrasonic beams in multiple directions by way of an ultrasonic probe and is configured to receive echo signals of the multiple directions by way of the ultrasonic probe. The tomographic image generating unit is configured to generate a tomographic image in accordance with each of the directions of the ultrasonic beams by use of the echo signals received by the ultrasound transmitting and receiving unit. The analyzing unit is configured to compare echo signals of corresponding spatial positions in the tomographic images generated by the tomographic image generating unit with respect to each of the directions of the ultrasonic beams, and is configured to perform an analysis based on the comparison. The analysis result display controller is configured to display the analysis result obtained by the analyzing unit onto the displaying unit.

Exemplary embodiments of the ultrasonic diagnostic apparatus and the storage medium are explained below.

First, the structure of an ultrasonic diagnostic apparatus 10 according to the first embodiment is explained. FIG. 1 is a block diagram for showing the structure of the ultrasonic diagnostic apparatus 10 according to the first embodiment. As illustrated in FIG. 1, the ultrasonic diagnostic apparatus 10 according to the first embodiment includes an apparatus main body 11, an ultrasonic probe 12, an input device 13, and a monitor 14.

The ultrasonic probe 12 includes multiple piezoelectric vibrators. These piezoelectric vibrators generate ultrasonic waves in accordance with a drive signal that is supplied by a later-described ultrasound transmitting unit 21 of the apparatus main body 11, and receive reflection waves from a patient P and convert them to electric signals. The ultrasonic probe 12 further includes a matching layer that is arranged in the piezoelectric vibrators, a backing material that prevents ultrasonic waves from propagating from the piezoelectric vibrators to the back, and the like.

When the ultrasonic probe 12 transmits an ultrasonic wave to the patient P, the transmitted ultrasonic wave is reflected sequentially from the discontinuous acoustic impedance surfaces of the body tissue of the patient P, and received as echo signals by the multiple piezoelectric vibrators of the ultrasonic probe 12. The amplitude of a received echo signal depends on a difference between the acoustic impedances of the discontinuous surfaces from which the ultrasound wave is reflected. If the echo signal is obtained from a ultrasonic pulse that is transmitted and reflected from the moving bloodstream or the surface of the cardiac wall or the like, the signal has a frequency deviation due to the Doppler effect, in accordance with the velocity component of the moving body with respect to the ultrasonic wave transmission direction.

The input device 13 includes a mouse, a keyboard, buttons, a panel switch, a touch instruction screen, a foot switch, a trackball, and the like, and is connected to the apparatus main body 11. In addition, the input device 13 receives various instructions and setting requests from the operator of the ultrasonic diagnostic apparatus 10, and sends the received instructions and setting requests (e.g., a request to set a region of interest (ROI)) to the apparatus main body 11.

The monitor 14 displays a graphical user interface (GUI) so that the operator of the ultrasonic diagnostic apparatus 10 can input various instructions and setting requests by use of the input device 13, and also displays an ultrasonic image generated by the apparatus main body 11 and analysis results.

The apparatus main body 11 generates an ultrasonic image in accordance with the reflection wave received by the ultrasonic probe 12. The apparatus main body 11 includes, as illustrated in FIG. 1, the ultrasound transmitting unit 21, an ultrasound receiving unit 22, a B-mode processing unit 23, a Doppler processing unit 24, an image generating unit 25, an image memory 26, an image synthesizing unit 27, a controller 28, a storage medium 29, and an interface 30.

The ultrasound transmitting unit 21 includes a pulse generator 21a, a transmission delaying unit 21b, and a pulser 21c, and supplies a drive signal to the ultrasonic probe 12. The pulse generator 21a repeatedly generates a rate pulse at a certain rate frequency to form a transmission ultrasonic wave. Moreover, the transmission delaying unit 21b gathers the ultrasonic wave generated by the ultrasonic probe 12 into a beam, and gives a delay time that is required for determination of the transmission directionality of each piezoelectric vibrator to each rate pulse generated by the pulse generator 21a. In addition, the pulser 21c applies a drive signal (drive pulse) to the ultrasonic probe 12 at a timing based on the rate pulse. The transmission direction and the delay time that determines the transmission direction are stored in the storage medium 29, and the transmission delaying unit 21b gives the delay time by referring to the storage medium 29.

Information of two-dimensional tomographic surfaces can be collected by repeating the scanning of the one-dimensional ultrasonic beam while changing its direction. A combination of beam directions that are required for generation of a tomographic image is not limited to a specific one, but there may be various combination patterns.

The ultrasound receiving unit 22 includes a preamplifier 22a, an A/D converter (not shown), a reception delaying unit 22b, and an adder 22c, and performs various processes onto the echo signal received by the ultrasonic probe 12 to generate echo data. The preamplifier 22a performs a gain correcting process by amplifying the echo signal. The A/D converter performs A/D conversion onto the gain-corrected echo signal. The reception delaying unit 22b provides it with a delay time that is necessary to determine the reception directionality. The adder 22c performs an adding process onto the echo signal that has been processed by the reception delaying unit 22b to generate echo data. The adder 22c enhances, through its adding process, the reflection component of the echo signal of a direction corresponding to the reception directionality, and forms an integrated beam of the ultrasonic transmission/reception based on the reception directionality and the transmission directionality. In the same manner as the transmission, the reception direction and the delay time that determines the reception direction are stored in the storage medium 29, and the reception delaying unit 22b gives the delay time by referring to the storage medium 29.

The echo signal received by the ultrasonic probe 12 is generated mainly from the boundary of the tissue. When there is a difference between the acoustic impedances of two media, a phenomenon of scattering (reflection) occurs. The physical constants that determine the acoustic impedance are the density and sonic velocity of a medium. In other words, the tissue characterization such as softness/stiffness directly affects the echo signal, from a broad point of view.

The B-mode processing unit 23 receives the echo data from the ultrasound receiving unit 22, performs logarithm amplification, envelope detection, and the like thereon, and generates data (B-mode data) that represents signal intensities by brightness.

The Doppler processing unit 24 performs a frequency analysis on the velocity information that is included in the echo data received from the ultrasound receiving unit 22, extracts echo components of the bloodstream, the tissue, and the contrast agent under the Doppler effect, and generates data (Doppler data) based on the moving body information extracted at multiple points, such as the average velocity, dispersion, and power.

The image generating unit 25 generates an ultrasonic image from the B-mode data generated by the B-mode processing unit 23 and the Doppler data generated by the Doppler processing unit 24. More specifically, the image generating unit 25 creates a B-mode image from the B-mode data, and a Doppler image from the Doppler data. In addition, the image generating unit 25 performs scan conversion to convert a scan line signal string of the ultrasonic scanning to a scan line signal string in a video format such as for television, and thereby creates an ultrasonic image (B-mode image and Doppler image) as a display image.

The image memory 26 is a memory that stores therein ultrasonic images generated by the image generating unit 25 and images obtained by performing image processing onto ultrasonic images. For example, after diagnosing, the operator can retrieve an image that has been stored during the test and reproduce it as a still image or use multiple images to reproduce them as a moving image. Furthermore, the image memory 26 stores therein an image brightness signal that has passed the ultrasound receiving unit 22, other raw data, image data obtained via the network, and the like, as the need arises.

The controller 28 is a processor that controls the entire processing performed by the ultrasonic diagnostic apparatus 10. More specifically, the controller 28 controls the processes performed by the ultrasound transmitting unit 21, the ultrasound receiving unit 22, the B-mode processing unit 23, the Doppler processing unit 24, and the image generating unit 25 based on various instructions and setting requests input by the operator by way of the input device 13 and various programs and setting information read from the storage medium 29, and also performs control so that the ultrasonic images stored in the image memory 26 and the like can be displayed on the monitor 14.

The storage medium 29 stores therein apparatus controlling programs for performing ultrasound transmission/reception, image processing, and display processing, and also various kinds of data such as diagnostic information (e.g., patient IDs and doctor's remarks), diagnostic protocols, and various setting information. In addition, the storage medium 29 stores therein an analysis program that describes the procedure for performing the same process as the later-described analyzing unit 28a and the procedure for performing the same process as the later-described analysis result display controller 28b. Moreover, the storage medium 29 is used, if necessary, to hold images stored in the image memory 26. The data stored in the storage medium 29 may be transferred to an external peripheral device by way of the interface 30.

The interface 30 deals with the input device 13, the network, and other external storage devices (not shown). The data such as ultrasonic images and the analysis results that are obtained by the ultrasonic diagnostic apparatus 10 may be transferred to another device by way of the interface 30 through the network.

The ultrasound transmitting unit 21, the ultrasound receiving unit 22, and the like that are contained in the apparatus main body 11 may be configured with hardware such as an integrated circuit, or may be a program configured as a software module.

The ultrasonic diagnostic apparatus 10 according to the first embodiment transmits ultrasonic beams in different directions by way of the ultrasonic probe 12, and receives echo signals of different directions by way of the ultrasonic probe 12.

FIG. 2 is a flowchart for the procedure of the process of displaying an ultrasonic image according to the first embodiment, and FIGS. 3A to 3D are diagrams for explaining transmission directions of ultrasonic beams according to the first embodiment. According to the first embodiment, it is assumed that the ultrasonic diagnostic apparatus 10 transmits ultrasonic beams of three directions, but the disclosed technology is not limited thereto. The number of transmission directions of the ultrasonic beams may be arbitrarily changed in accordance with the form of practice.

As illustrated in FIG. 2, when the process is started in response to a start instruction or the like from the operator, the ultrasonic diagnostic apparatus 10 obtains the number of beam patterns (step S101). For example, the ultrasonic diagnostic apparatus 10 may obtain the number by reading the number of beam patterns, "3", which is stored in the storage medium 29 in advance, from the storage medium 29. In addition, the ultrasonic diagnostic apparatus 10 may obtain the number when the instruction of the beam pattern "3" is received from the operator.

Next, the ultrasonic diagnostic apparatus 10 performs transmission/reception of an ultrasonic wave in the i-th beam direction (step S102). More specifically, first, the transmission delaying unit 21b and the reception delaying unit 22b each calculate a delay time in accordance with the number of beam patterns obtained at step S101. According to the first embodiment, because the number of beam patterns is "3", the transmission delaying unit 21b and the reception delaying unit 22b calculate a delay time for the three transmissions/receptions for each element so that the beam takes the determined direction. Then, the ultrasound transmitting unit 21 and the ultrasound receiving unit 22 performs ultrasound transmission/reception by use of the patterns of the delay times calculated by the transmission delaying unit 21b and the reception delaying unit 22b.

For example, the ultrasound transmitting unit 21 and the ultrasound receiving unit 22 transmit and receive ultrasonic waves in such a manner that the direction of scan lines 42 forms an angle of 90 degrees with respect to the piezoelectric vibrators of the ultrasonic probe 12, as illustrated in FIG. 3A.

Thereafter, the ultrasonic diagnostic apparatus 10 generates a B-mode image (step S103). More specifically, the B-mode processing unit 23 receives the echo data from the ultrasound receiving unit 22, generates B-mode data from the received echo data, and sends the generated B-mode data to the image generating unit 25. Then, the image generating unit 25 generates a B-mode image from the B-mode data that is received from the B-mode processing unit 23.

Then, the ultrasonic diagnostic apparatus 10 determines whether the N-th (the third, according to the first embodiment) beam pattern is completed (step S104), and if it is not completed (no at step S104), the system returns to the operation of step S102. In this manner, the ultrasonic diagnostic apparatus 10 according to the first embodiment generates three B-mode images in correspondence with the number of beam patterns "3".

Figure 3B:
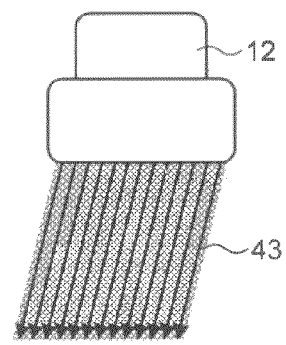
Figure 3C:
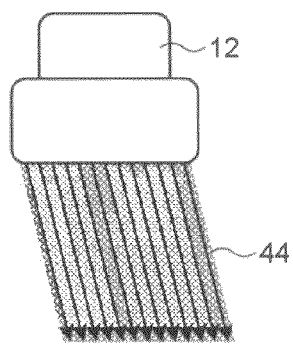

For example, the ultrasound transmitting unit 21 and the ultrasound receiving unit 22 transmit and receive ultrasonic waves in such a manner that the direction of scan lines 43 forms an angle smaller than 90 degree with respect to the piezoelectric vibrators of the ultrasonic probe 12, as illustrated in FIG. 3B, and thereby generate a B-mode image. Furthermore, for example, the ultrasound transmitting unit 21 and the ultrasound receiving unit 22 transmit and receive ultrasonic waves in such a manner that the direction of scan lines 44 forms an angler larger than 90 degrees with respect to the piezoelectric vibrators of the ultrasonic probe 12, as illustrated in FIG. 3C, and thereby generate a B-mode image.

Figure 3D:
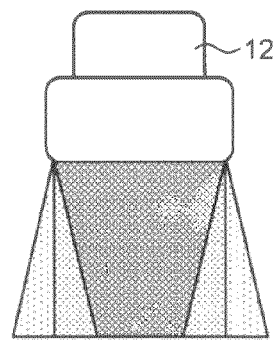

When it is determined at step S104 that it is completed (yes at step S104), the ultrasonic diagnostic apparatus 10 generates a superimposed image (step S105), and displays the generated superimposed image onto the monitor 14 (step S106). More specifically, the image generating unit 25 superimposes three B-mode images that are generated in correspondence with the number of beam patterns "3" into a superimposed image as a display image, and sends the generated superimposed image to the image synthesizing unit 27. Then, the image synthesizing unit 27 adds other information to the superimposed image sent from the image generating unit 25 and displays it onto the monitor 14. In FIG. 3D, a superimposed beam pattern after the transmission/reception of the ultrasonic beams of the three different directions is illustrated.

The ultrasonic diagnostic apparatus 10 repeats the above process procedure of steps S102 to S106 until the process is terminated in response to the reception of a termination instruction or the like from the operator, and displays ultrasonic images in real time. In the explanation of the first embodiment, the image generating unit 25 is configured to generate a superimposed image from B-mode images, but the disclosed technology is not limited thereto. For example, the image generating unit 25 may generate a superimposed image directly from the B-mode data.

As described above, the ultrasonic diagnostic apparatus 10 according to the first embodiment implements a process of transmitting and receiving ultrasonic beams of different directions and displaying a superimposed image in real time. In addition to this process, it also implements a process of comparing and analyzing echo signals of corresponding spatial positions in tomographic images of the different directions. In the following description, when a "tomographic image of each direction" is mentioned, it may be applied to both "B-mode data" and "B-mode image" according to the disclosed technology, but according to the first embodiment, it is assumed to be a "B-mode image".

FIG. 4 is a diagram for explaining the storage of tomographic images according to the first embodiment. As illustrated in FIG. 4, the ultrasonic diagnostic apparatus 10 according to the first embodiment displays the superimposed image that is generated as a display image onto the monitor 14 in real time, and also performs a process of storing the generated superimposed image into the image memory 26. Furthermore, separately from this process, the ultrasonic diagnostic apparatus 10 according to the first embodiment stores a tomographic image of each direction in the image memory 26. This is to be subjected to the comparing and analyzing process.

Figure 5:
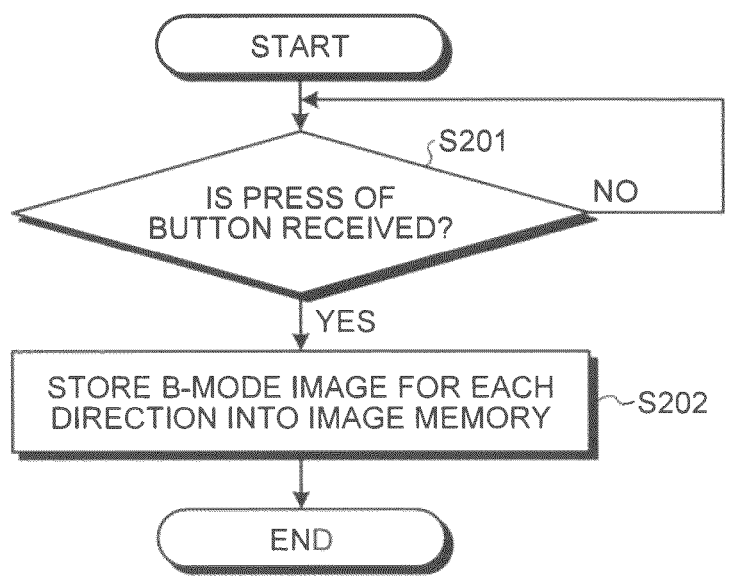
FIG. 5 is a flowchart for showing the procedure of a process of storing the tomographic images according to the first embodiment.

FIG. 5 is a flowchart of the procedure of the tomographic image storing process according to the first embodiment. As indicated in FIG. 5, when receiving a press of a button from the operator (yes at step S201), the ultrasonic diagnostic apparatus 10 according to the first embodiment stores a B-mode image of each direction into the image memory 26 (step S202). For example, the image generating unit 25 generates three B-mode images (the first, second, and third tomographic images) respectively from three items of B-mode data that are collected at the timing of the press of the button, and stores the three generated B-mode images into the image memory 26.

Figure 6A:
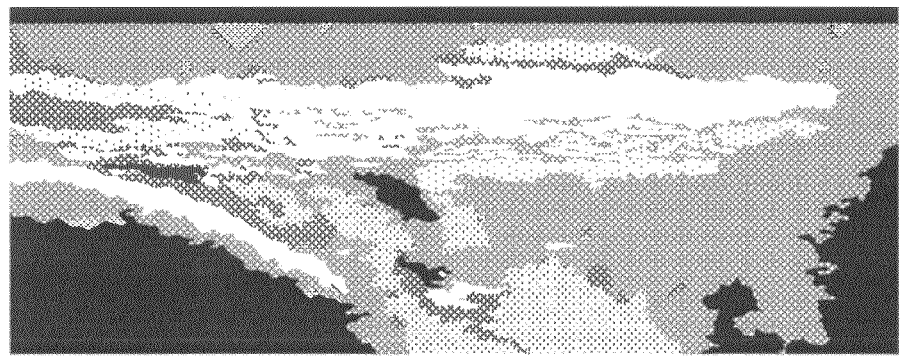
FIGS. 6A to 6C are diagrams for showing multiple tomographic images generated for different directions of ultrasonic beams according to the first embodiment.
Figure 6B:
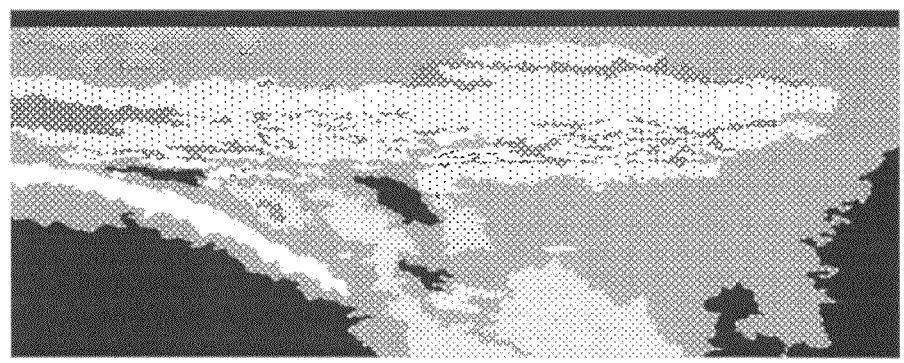
Figure 6C:

FIGS. 6A to 6C are diagrams for showing example tomographic images generated for different directions of the ultrasonic beams according to the first embodiment. It is assumed here that FIG. 6A corresponds to FIG. 3A, FIG. 6B corresponds to FIG. 3B, and FIG. 6C corresponds to FIG. 3C. The image generating unit 25 stores, for example, the three B-mode images illustrated in FIGS. 6A to 6C in the image memory 26.

For example, as shown in FIGS. 6A to 6C, the brightness of the subcutaneous tissue immediately under the ultrasonic probe 12 is constant among the B-mode images, regardless of the direction of the ultrasonic beam. In contrast, the tendon that runs laterally under the subcutaneous tissue immediately under the ultrasonic probe 12 exhibits the highest brightness (being the brightest) in the B-mode image of FIG. 6A, whereas the brightness is lower (darker) in the B-mode images of FIGS. 6B and 6C.

The B-mode image of FIG. 6A is a tomographic image obtained when the ultrasonic beams are incident substantially vertically onto the tendon, as explained with reference to FIG. 3A. On the other hand, the B-mode images of FIGS. 6B and 6C are tomographic images obtained when the ultrasonic beams are incident slightly obliquely onto the tendon.

In this manner, when B-mode images are generated for different directions by changing the direction of the ultrasonic beams, the same portions of the images look different in brightness. This is attributed to the anisotropy effect of the tissue. For example, the tissue having a fiber structure in which fibers run in a specific direction, such as muscle and tendon, has a characteristic that the intensity of the reflected echo signal varies in accordance with the incident direction of the ultrasonic beams. This is the anisotropy effect.

In FIG. 1, the controller 28 includes the analyzing unit 28a and the analysis result display controller 28b. These units perform the process of comparing and analyzing the echo signals of the corresponding spatial positions in the tomographic images of different directions. The analyzing unit 28a compares the echo signals of the corresponding spatial positions in the tomographic images that are generated for the different directions of the ultrasonic beams, and analyzes the tissue characterization of the patient described in the tomographic images. More specifically, the analyzing unit 28a analyzes the tissue characterization by comparing the brightness levels assigned in accordance with the intensity of the echo signal. The method may be such that the intensities of the echo signals are directly compared. The analysis result display controller 28b displays the analysis result obtained by the analyzing unit 28a onto the monitor 14.

Figure 7:
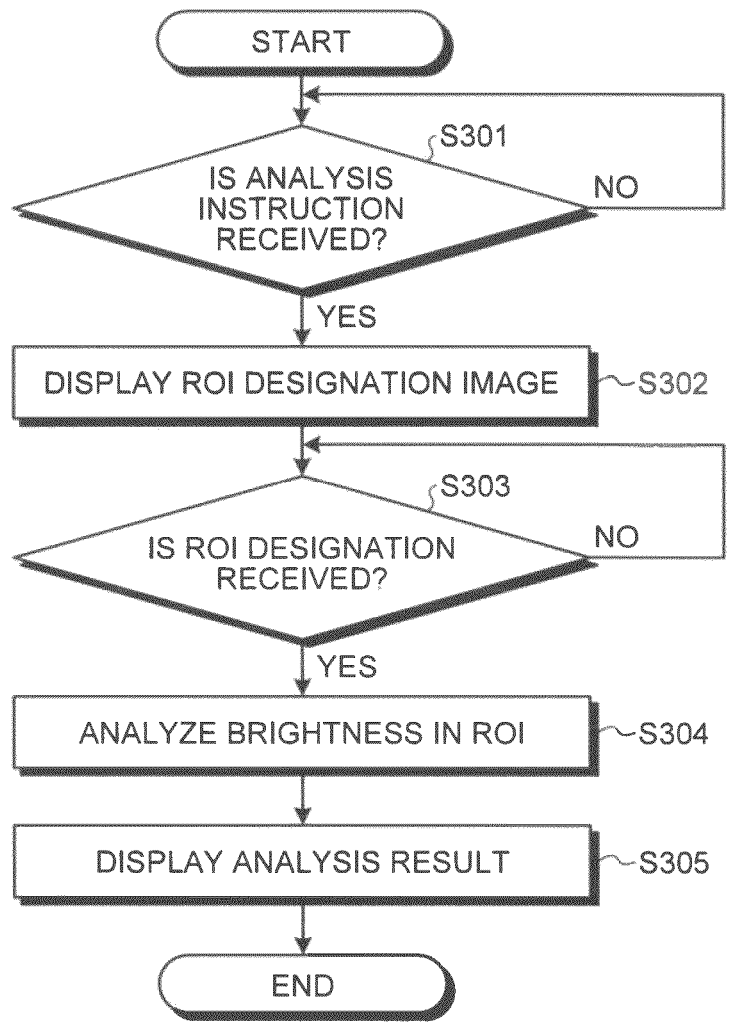
FIG. 7 is a flowchart for showing the procedure of a process of conducting an analysis and displaying the analytical result according to the first embodiment.
Figure 8:
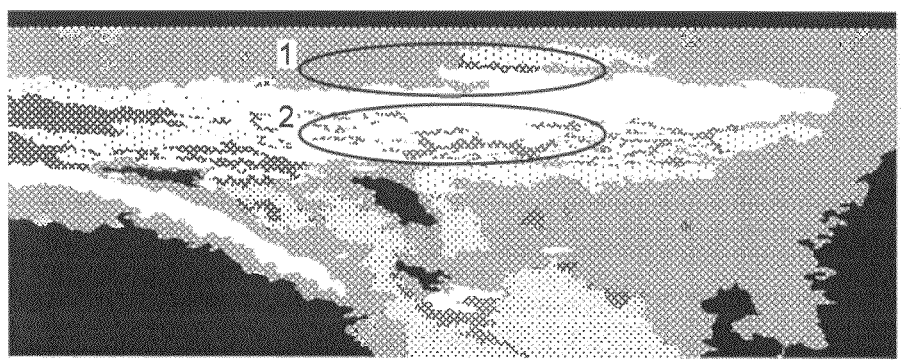
FIG. 8 is a diagram for showing an example of received designation of regions of interest (ROIs) according to the first embodiment.
Figure 9:
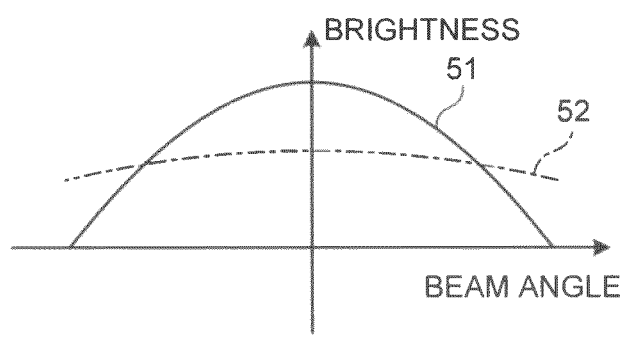
FIG. 9 is a diagram for showing an example of an analysis result displayed according to the first embodiment.

FIG. 7 is a flowchart of the procedure of the process of performing the analysis and displaying the analysis result according to the first embodiment. FIG. 8 is a diagram for showing an example of ROI designation that is received according to the first embodiment, and FIG. 9 is a diagram for showing an example analysis result that is displayed according to the first embodiment.

As indicated in FIG. 7, first, the analyzing unit 28a determines whether an analysis instruction is received from the operator (step S301), and when it determines that the instruction is received (yes at step S301), a ROI designation image is displayed (step S302). For example, the analyzing unit 28a displays a ROI designation image on the monitor 14, as illustrated in FIG. 8.

Next, the analyzing unit 28a receives ROI designation on the image displayed at step S302. When it is received (yes at step S303), the analyzing unit 28a analyzes the brightness of the ROI (step S304).

For example, as indicated in FIG. 8, the analyzing unit 28a receives "ROI 1" and "ROI 2" designated on the ROI designation image. Then, the analyzing unit 28a analyzes the brightness of the "ROI 1" in each of the B-mode images that are generated for the different directions of the ultrasonic beams, and compares the echo signals of the corresponding spatial positions in the B-mode images by, for example, obtaining the average of the brightness levels of the "ROI 1". Moreover, the analyzing unit 28a analyzes the brightness of the "ROI 2" in each of the B-mode images that are generated for the different directions of the ultrasonic beams, and compares the echo signals of the corresponding spatial positions in the B-mode images by, for example, obtaining the average of the brightness levels of the "ROI 2".

Thereafter, the analysis result display controller 28b displays the analysis result (step S305). For example, the analysis result display controller 28b displays the analysis result of FIG. 9 onto the monitor 14. The analysis result of FIG. 9 is a mere example, and the analysis result display controller 28b may display the analysis result by use of figures, texts, or other graphs.

The analysis result according to the first embodiment is now explained with reference to FIG. 9. In FIG. 9, the relationship between the beam angle and the brightness level is presented for each ROI. For example, a full-line curve 51 corresponds to the "ROI 1", and a dashed-line curve 52 corresponds to the "ROI 2". Then, the analysis result of the "ROI 1" shows that the brightness changes in accordance with the angle of the ultrasonic beams, while the analysis result of the "ROI 2" shows that there is little change in the brightness in accordance with the angle of the ultrasonic beams.

As discussed above, the tissue with a fiber structure has an anisotropy effect that the intensity of the reflected echo signal varies in accordance with the incident direction of the ultrasonic beams. In other words, it is considered that, if the tissue having the anisotropy effect is normal, the brightness should vary in accordance with the direction of the ultrasonic beams, when comparing the echo signals of the corresponding spatial positions in the tomographic images generated for the different directions of the ultrasonic beams. In contrast, when the echo signals of the corresponding spatial positions in the tomographic images that are generated for the different directions of the ultrasonic beams are compared to find that the brightness does not vary in accordance with the direction of the ultrasonic beams, the tissue is considered abnormal.

That is, in the example of FIG. 9, it is considered that the "ROI 1" in which the brightness varies in accordance with the angle of the ultrasonic beams is normal but that the "ROI 2" in which the brightness does not vary in accordance with the angle of the ultrasonic beams is abnormal. In this manner, the information shown on the ultrasonic image is quantitatively represented in the analysis result displayed by the analysis result display controller 28b so that the operator can quantitatively grasp the information on the ultrasonic image by checking the analysis result displayed on the monitor 14.

For the sake of simplicity, it is explained above that the tissue being "normal" or "abnormal" is quantitatively expressed, but the analysis result is not limited to the normality/abnormality of the tissue. For example, the tissue characterization may be quantitatively expressed such as readiness to reflect the ultrasonic beams in various directions or in a certain direction only.

Figure 10:
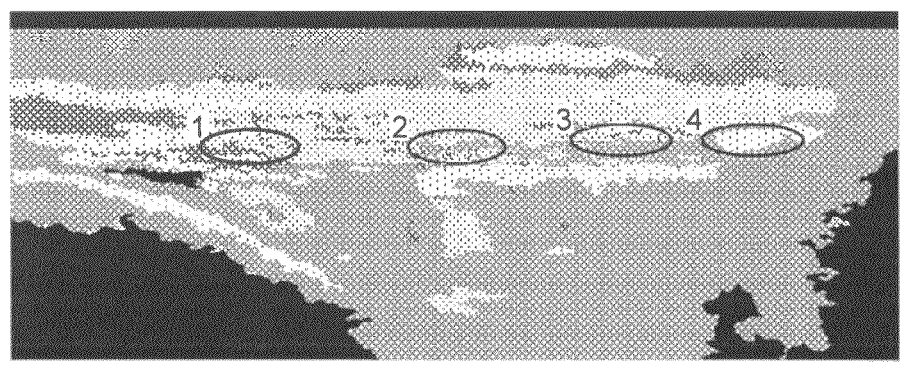
FIG. 10 is a diagram for showing another example of designation of ROIs according to the first embodiment.
Figure 11:
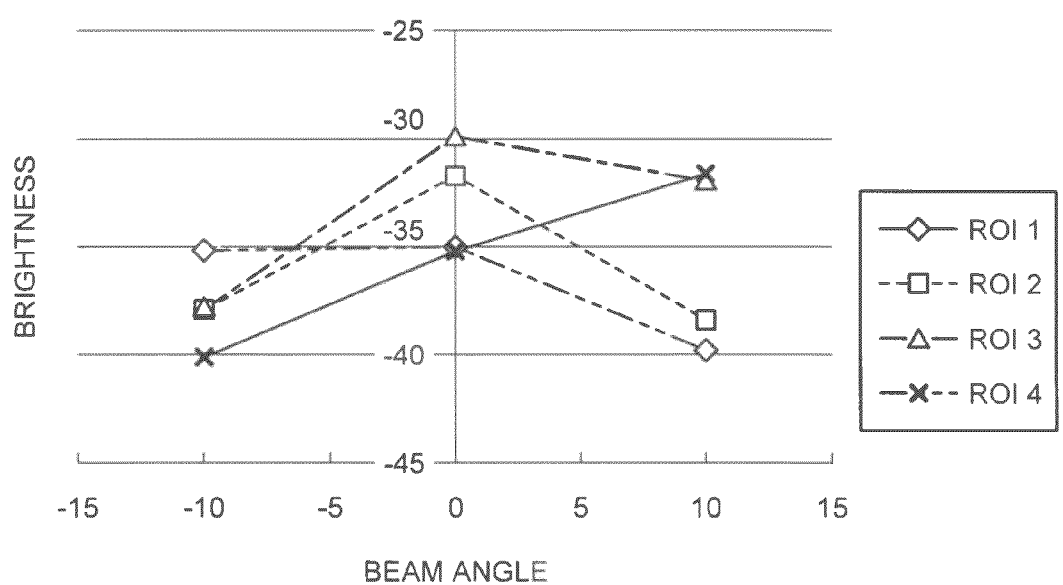
FIG. 11 is a diagram for showing another example of an analysis result displayed according to the first embodiment.

In addition, according to the first embodiment, designation of two ROIs is explained, but the disclosed technology is not limited thereto. FIG. 10 is a diagram for showing another example of designation of ROIs according to the first embodiment, and FIG. 11 is a diagram for showing another example of an analysis result that is displayed according to the first embodiment.

For example, the analyzing unit 28a receives designation of "ROI 1", "ROI 2", "ROI 3", and "ROI 4" on a ROI designation image, as illustrated in FIG. 10. Then, the analyzing unit 28a analyzes the brightness of the "ROI 1", "ROI 2", "ROI 3", and "ROI 4" for each of the B-mode images generated for the different directions of the ultrasonic beams, and compares the echo signals of the corresponding spatial positions in the B-mode images. Then, the analysis result display controller 28b displays the analysis result, as illustrated in FIG. 11.

As described above, in the ultrasonic diagnostic apparatus 10 according to the first embodiment, the ultrasound transmitting unit 21 and the ultrasound receiving unit 22 transmit ultrasonic beams of multiple directions by way of the ultrasonic probe 12 and also receive echo signals of multiple directions by way of the ultrasonic probe 12. Then, the B-mode processing unit 23 and the image generating unit 25 generate a tomographic image for each of the directions of the ultrasonic beams by use of the echo signals received by the ultrasound receiving unit 22. Further, the analyzing unit 28a compares the echo signals of the corresponding spatial positions in the tomographic images generated for the different directions of the ultrasonic beams, and analyzes the tissue characterization of the patient described in the tomographic images. Then, the analysis result display controller 28b displays the analysis result obtained by the analyzing unit 28a onto the monitor 14. In this manner, according to the first embodiment, the information on the ultrasonic image can be quantitatively expressed. The ultrasonic diagnostic apparatus 10 can quantitatively display, for example, the anisotropy effect. As a result, the operator can easily distinguish, for example, the tissue that has a fiber structure in a specific direction from the tissue that does not.

Moreover, the analyzing unit 28a analyzes the tissue characterization by comparing the intensities of the echo signals or the brightness levels assigned in accordance with the intensities. In this manner, according to the first embodiment, the characterization of the tissue having the anisotropy effect can be effectively analyzed.

Still further, the analyzing unit 28a receives the designation of ROIs, and compares the echo signals of the designated ROIs. Hence, according to the first embodiment, only the regions desired to be analyzed can be subjected to the analyzing process so that the analyzing process can be efficiently conducted.

Next, an ultrasonic diagnostic apparatus 10 according to the second embodiment is explained. The ultrasonic diagnostic apparatus 10 according to the second embodiment displays a color mapping image as an analysis result.

Figure 12A:
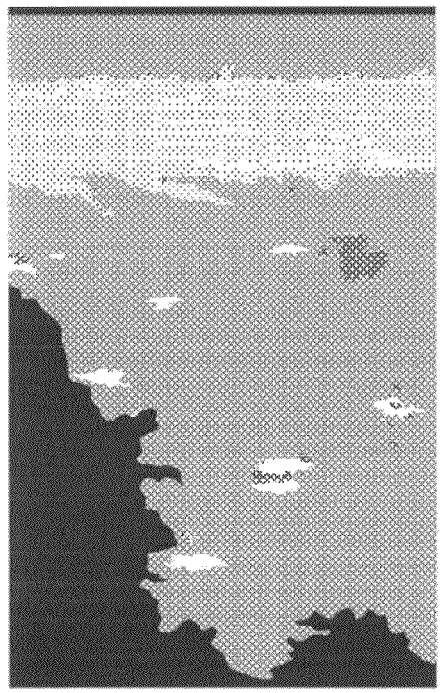
FIGS. 12A to 12C are diagrams for showing an example of an analysis result displayed according to a second embodiment.
Figure 12B:
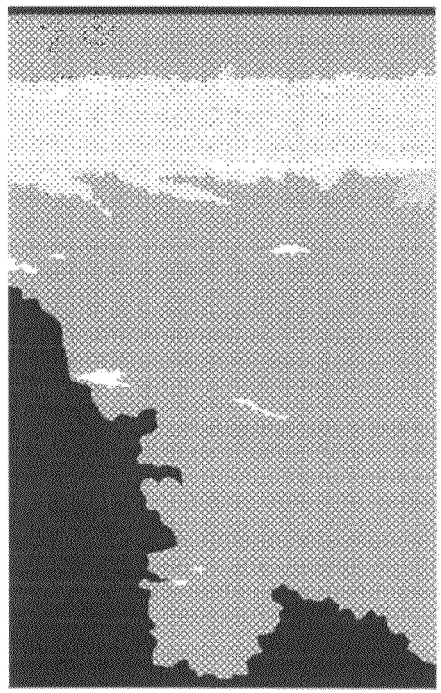
Figure 12C:
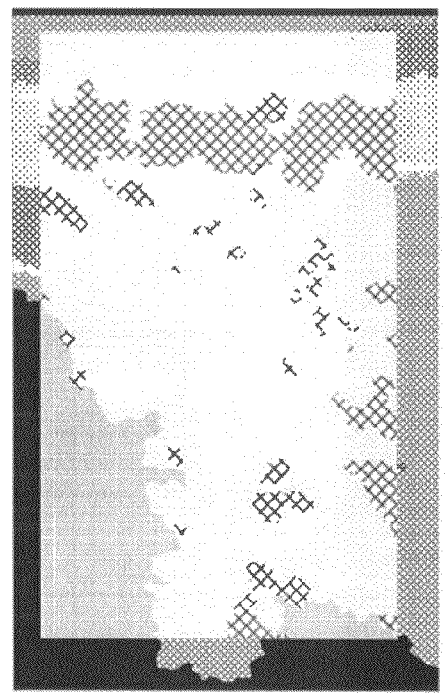

FIGS. 12A to 12C are diagrams for showing the analysis result that is displayed according to the second embodiment. For example, the analyzing unit 28a according to the second embodiment obtains a change in the brightness levels of pixels of corresponding spatial positions in multiple B-mode images so as to obtain the degree of anisotropic effect. For example, the analyzing unit 28a selects two of the B-mode images, and calculates a difference between the brightness levels of pixels of corresponding spatial positions in the selected B-mode images. Then, the analyzing unit 28a assigns a color in accordance with the calculated difference of brightness, and the analysis result display controller 28b displays a color mapping image in which the image with colors assigned by the analyzing unit 28a and the original image are superimposed. The analysis result display controller 28b does not always have to superimpose the color assigned image and the original image, but may display the color assigned image only as a color mapping image.

As illustrated in FIGS. 12A to 12C, for example, the analyzing unit 28a selects the B-mode image of FIG. 12A and the B-mode image of FIG. 12B, and calculates the difference in the brightness levels of the pixels of corresponding spatial positions in the selected B-mode images. Furthermore, the analyzing unit 28a assigns colors in accordance with the calculated brightness differences. For example, colors are assigned so that a red component is intensified as the brightness difference increases while a yellow component is intensified as the brightness difference decreases. Thereafter, the analysis result display controller 28b displays a color mapping image in which the color assigned image and the original image are superimposed, as illustrated in FIG. 12C. For example, in the color mapping image of FIG. 12C, the tendon that exhibits a large anisotropy effect and other regions that exhibits smaller anisotropy effects are clearly distinguished. In FIGS. 12A to 12C, different colors are represented by different patterns, for the sake of simplicity.

Figure 13A:
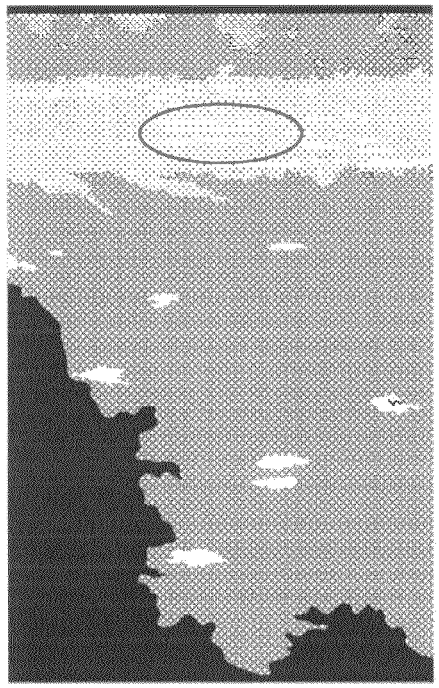
FIGS. 13A to 13C are diagrams for showing another example of an analysis result displayed according to the second embodiment.
Figure 13B:
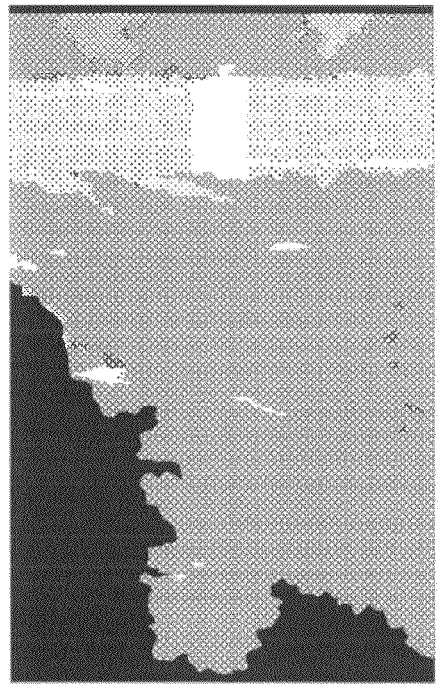
Figure 13C:
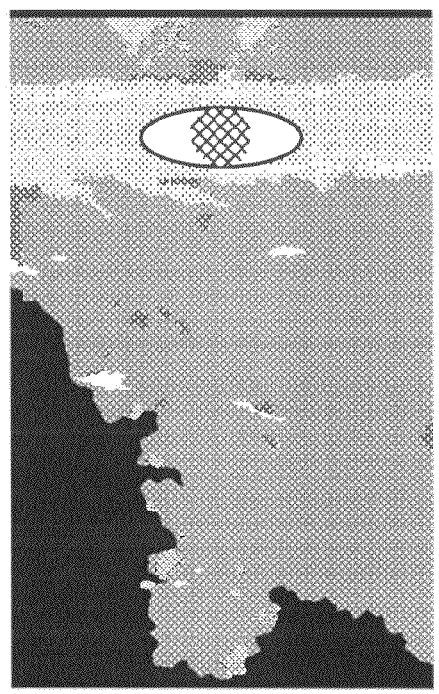

According to the second embodiment, the designation of ROIs can be received in the same manner as the first embodiment. FIGS. 13A to 13C are diagrams for showing another example analysis result that is displayed according to the second embodiment. For example, as illustrated in FIGS. 13A to 13C, the analyzing unit 28a selects the B-mode image of FIG. 13A and the B-mode image of FIG. 13B, and calculates a difference between the brightness levels of pixels of corresponding spatial positions in the ROI-designated areas of the selected B-mode images. Furthermore, the analyzing unit 28a assigns colors in accordance with the calculated brightness differences. Then, the analysis result display controller 28b displays a color mapping image in which the color assigned image and the original images are superimposed, as illustrated in FIG. 13C. For example, the color mapping image illustrated in FIG. 13C indicates that, in the "tendon", which exhibits a large anisotropy effect, only a portion of it shows a weaker anisotropy effect. A doctor, for example, may see this color mapping image and easily spot loss or rupture that has been caused in part of the tendon.

In the examples of FIGS. 12A to 12C and FIGS. 13A to 13C, because the analysis target tissue has a fiber structure that runs in a horizontal direction, a desired result can be achieved with the method of comparing two B-mode images. However, if the analysis target tissue is not positioned horizontally with respect to the surface of the elements of the ultrasonic probe 12, the above method may not produce a result as desired.

For this reason, it is generally preferable that a method of comparing three B-mode images or more be adopted. In such a situation, the analyzing unit 28a, for example, compares pixels of corresponding spatial positions in three B-mode images or more, and finds the angle of the ultrasonic beams that exhibit the highest brightness. Then, the analyzing unit 28a calculates a difference between the brightness at angles certain degrees greater and smaller than this angle and the maximum brightness, and assigns colors thereto.

For example, when the brightness level with a beam angle of x degrees at point A in the B-mode image is I (x), and the beam angle that exhibits the maximum brightness is $x_{max}$, the brightness levels at the point A in a B-mode image obtained by transmitting and receiving beams at angles that are α degree shifted from the beam angle $x_{max}$ are I $(x_{max}+α)$ and I $(x_{max}-α)$. Thus, the differences between these brightness levels and the maximum brightness are I $(x_{max})$–I $(x_{max}+α)$ and I $(x_{max})$–I $(x_{max}-α)$. Thus, the average of I $(x_{max})$–I $(x_{max}+α)$ and I $(x_{max})$–I $(x_{max}-α)$ is defined as the level of anisotropy effect.

Figure 14:
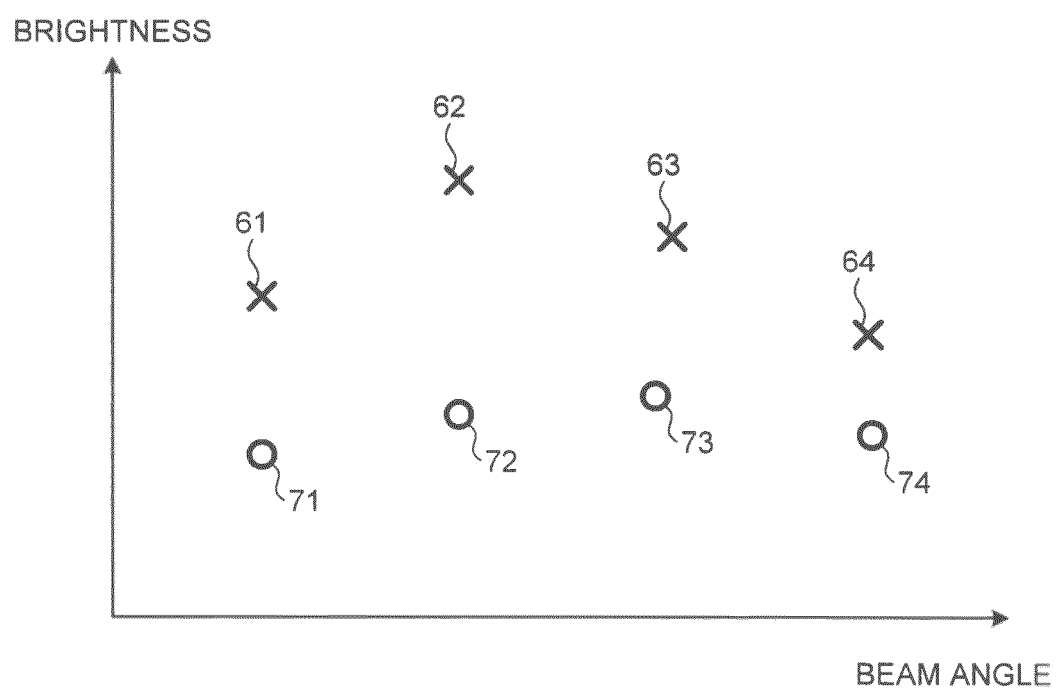
FIG. 14 is a diagram for explaining the analysis according to the second embodiment.

FIG. 14 is a diagram for explaining the analysis according to the second embodiment. In FIG. 14, the maximum brightness among points indicated by x in the B-mode image is achieved at a beam angle of the numeral 62. On the other hand, the maximum brightness among points indicated by o in the B-mode image is obtained at a beam angle of the numeral 73. For the levels of anisotropy effect at these two points, the level at the former point (x) is calculated by use of the brightness levels at the beam angles of the numerals 61, 62, and 63. On the other hand, the level of the latter point (o) is calculated by use of the brightness levels at the beam angles of the numerals 72, 73, and 74. Then, the analyzing unit 28a assigns colors in accordance with the obtained anisotropy effect levels. In this manner, the analyzing unit 28a can quantitatively find the anisotropy effect levels, whether the analysis target tissue runs in a horizontal direction or not with respect to the ultrasonic probe 12.

Next, the ultrasonic diagnostic apparatus 10 according to the third embodiment is explained. In the explanation of the first and second embodiments, an example of the ultrasonic diagnostic apparatus 10 performing an ex-post analysis of the tissue characterization, but the disclosed technology is not limited thereto. In other words, the ultrasonic diagnostic apparatus 10 according to the third embodiment displays an ultrasonic image in real time, performs an analysis of the tissue characterization in real time, and displays the analysis result in real time.

Figure 15:
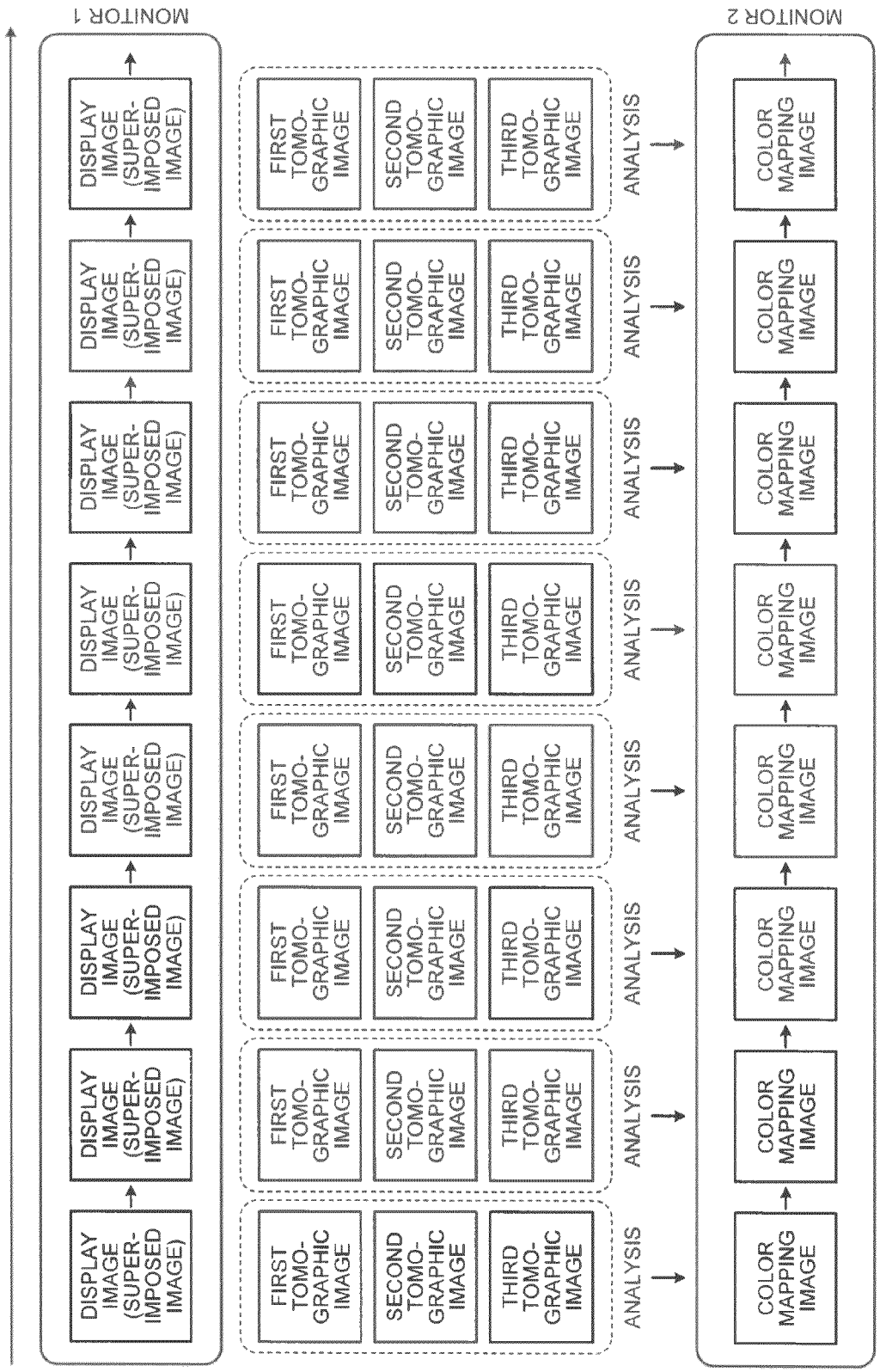
FIG. 15 is a diagram for explaining the analysis and the displayed analysis result according to a third embodiment.

FIG. 15 is a diagram for explaining the analysis and display of the analysis result according to the third embodiment. As illustrated in FIG. 15, the ultrasonic diagnostic apparatus 10 according to the third embodiment displays a superimposed image generated as a display image onto the monitor 14 in real time, and stores a tomographic image of each direction into the image memory 26 in real time. Then, the ultrasonic diagnostic apparatus 10 according to the third embodiment analyzes the tomographic images of different directions stored in the image memory 26 in real time, and displays a color mapping image, which is the analysis result, onto the monitor 14 in real time. For the method of generating the color mapping image, the method according to the second embodiment can be adopted. Moreover, a monitor (monitor 1) for displaying superimposed images generated as display images and another monitor (monitor 2) for displaying color mapping images are illustrated in FIG. 15, but the superimposed images and the color mapping images may be displayed on the same monitor or on different monitors.

FIG. 16 is a flowchart of the procedure of a process of displaying an ultrasonic image according to the third embodiment, and FIG. 17 is a flowchart of the procedure of a process of performing an analysis and displaying the analysis result according to the third embodiment. As can be seen from the comparison of the process procedure of FIG. 16 with the process procedure of FIG. 2, the operation of step S403 performed by the ultrasonic diagnostic apparatus 10 according to the third embodiment is different from the operation of step S103.

In the ultrasonic diagnostic apparatus 10 according to the first embodiment, the B-mode image generated at step S103 is stored temporarily in the image memory 26 until the superimposed image is generated at step S105, but it does not specifically need to be held after the superimposed image is generated. This is because the image is not an analysis target. For this reason, the storage of the B-mode image is not indicated in the flowchart of FIG. 2, but the storage of the B-mode image is indicated in the flowchart of FIG. 5.

In the ultrasonic diagnostic apparatus 10 according to the third embodiment, the tissue characterization is analyzed in real time, and the analysis result is displayed in real time. Thus, the B-mode image generated at step S403 is stored in the image memory 26 to be used as an analysis target image.

Then, as indicated in FIG. 17, when B-mode images the number (N) of which corresponds to that of beam patterns are entered in the image memory 26 (yes at step S501), the analyzing unit 28a calculates the brightness difference in real time (step S502). Then, the analyzing unit 28a performs color mapping in real time in accordance with the brightness difference (step S503), and the analysis result display controller 28b displays the color mapping image in real time (step S504). For example, the analysis result display controller 28b may display the color mapping image together with the regular ultrasonic image (superimposed image) in real time. The operations of steps S501 to S504 are repeated until, for example, a termination instruction is received from the operator.

The disclosed technology may be embodied in various other forms than the above embodiments.

Display of Organized-by-direction B-mode Images

Figure 18:
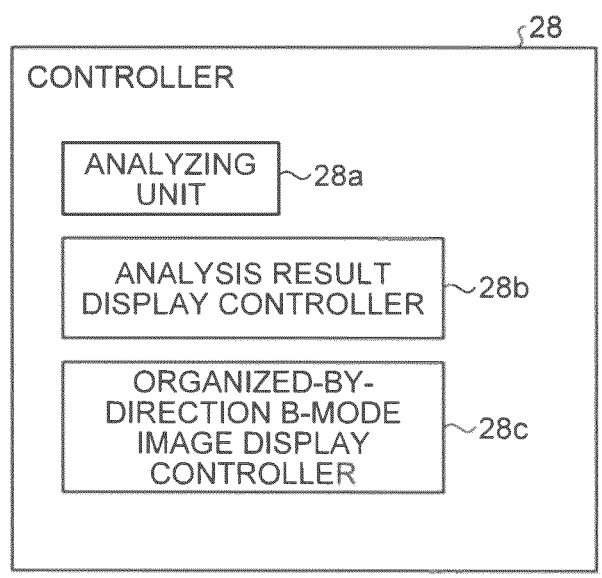
FIG. 18 is a block diagram for showing the structure of a controller according to a fourth embodiment.
Figure 19:
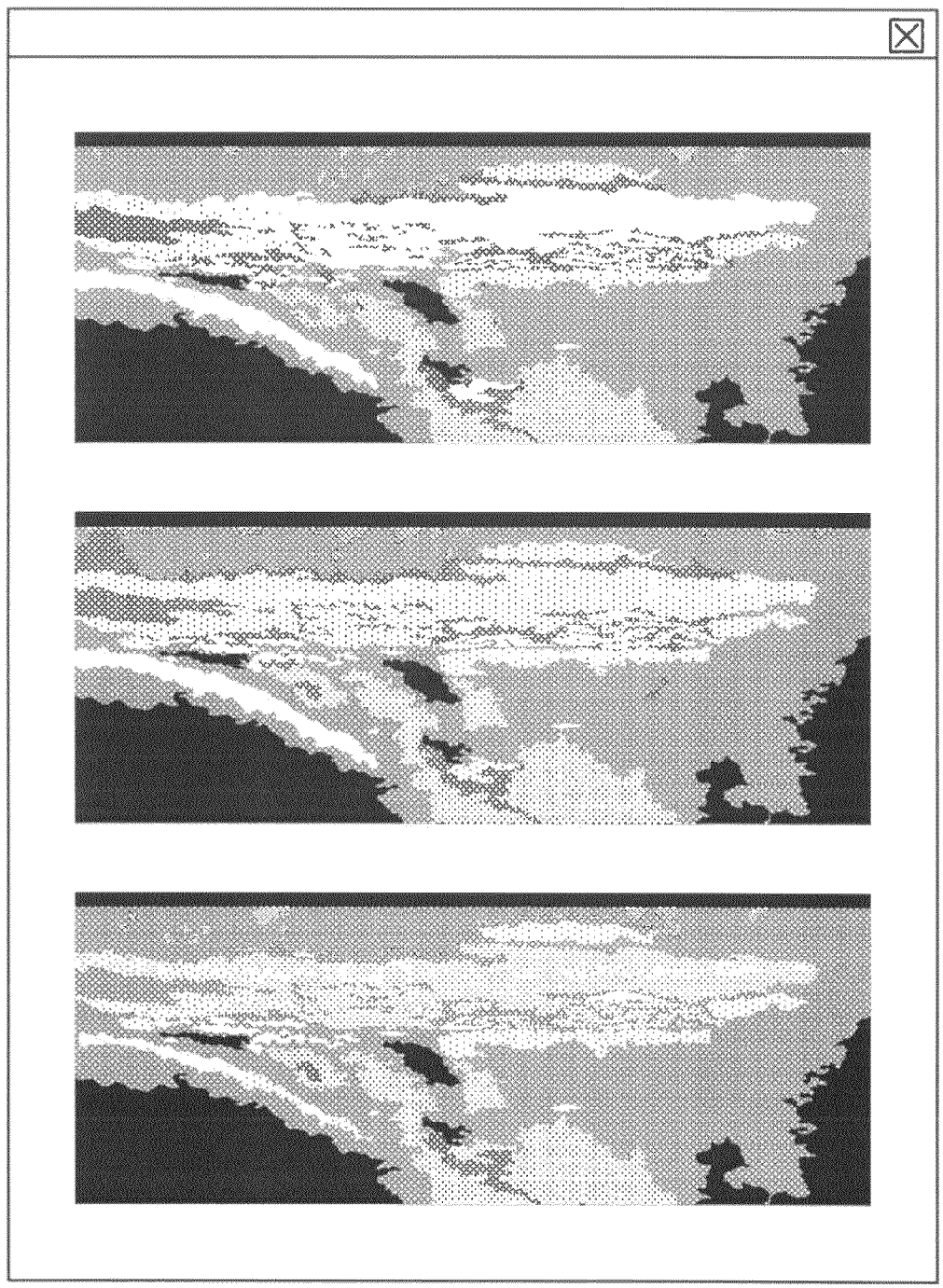
FIG. 19 is a diagram for showing example B-mode images displayed according to the fourth embodiment.

FIG. 18 is a block diagram for showing the structure of the controller 28 according to the fourth embodiment, FIG. 19 is a diagram for showing examples of B-mode images displayed according to the fourth embodiment, and FIG. 20 is a diagram for showing other examples of B-mode images displayed according to the fourth embodiment.

As illustrated in FIG. 18, the controller 28 according to the fourth embodiment further includes an organized-by-direction B-mode image display controller 28c. The organized-by-direction B-mode image display controller 28c lays out and displays the B-mode images generated for different directions of the ultrasonic beams onto the monitor 14, or switches from one of the B-mode images to another for display. Hence, the operator can easily compare the B-mode images generated for different directions with each other.

For example, the organized-by-direction B-mode image display controller 28c lays the B-mode images out that are generated for different directions of the ultrasonic beams onto the monitor 14, as illustrated in FIG. 19. In addition, for example, the organized-by-direction B-mode image display controller 28c switches one of the B-mode images generated for different directions of the ultrasonic beams to another, as illustrated in FIG. 20. For example, when the operator manipulates the trackball (see the arrows in FIG. 20), the B-mode images generated for different directions of the ultrasonic beams are switched and displayed frame by frame.

According to the above embodiments, the transmission delaying unit 21b and the reception delaying unit 22b calculate delay times, and the transmission/reception of ultrasonic waves are conducted by use of the patterns of the calculated delay times. The disclosed technology is not limited thereto, however. For example, the control of the delay time calculation and the like may be conducted by the controller 28.

Correction at Analysis

In addition, according to the above embodiments, the analyzing unit 28a does not perform any correction to the B-mode images when analyzing them, but the disclosed technology is not limited thereto. The analysis of the B-mode images may be conducted after corrections are made. For example, when the ultrasonic beams are transmitted and received in a direction shifted from the direction of the normal to the surface of the elements of the ultrasonic probe 12, echo signals tend to become weaker in accordance with the change of the acoustic field than in the transmission/reception in the direction of the normal. For this reason, the analyzing unit 28a may conduct the analysis after making corrections in advance to make up for the amount of change in the brightness that is caused under this influence. For example, the analyzing unit 28a stores in advance the amount of change in the brightness that is acquired as experimental data or the like, for each direction of the ultrasonic beams. The analyzing unit 28a refers to the storage unit by use of the corresponding direction of the ultrasonic beams, and obtains the amount of change in the brightness that is to be corrected. Then, the analyzing unit 28a corrects the brightness of the B-mode image in accordance with the obtained amount of change, and then conducts the analysis thereof. The timing of the correction may be before the analysis, or may be when a B-mode image is generated.

Analysis Program

In addition, the analysis method explained in the above embodiments may be implemented by realizing the information processing in accordance with an analysis program by use of a computer. Such a computer may include a central processing unit (CPU), a system memory, a hard disk drive interface, a disk drive interface, a serial port interface, a video adopter, and a network interface, and these units are connected to one another by a system bus. The system memory includes a read only memory (ROM) and a random access memory (RAM). The ROM stores, for example, a boot program such as a basic input output system (BIOS). The hard disk drive interface is connected to the hard disk drive. The disk drive interface is connected to a disk drive. For example, a removable storage medium such as a magnetic disk and an optical disk is inserted into the disk drive. The serial port interface may be connected to a mouse and a keyboard. The video adopter may be connected to a display.

Here, the hard disk drive stores therein the operating system (OS), application programs, program modules, and program data. In other words, the analysis program according to the disclosed technology is stored, for example, in the hard disk as a program module in which computer-executable instructions are described. More specifically, the program module in which the procedure of the same process as that of the analyzing unit 28a and the procedure of the same process as that of the analysis result display controller 28b according to the present embodiments are described is stored in the hard disk.

The program module and the program data for the analysis program do not always have to be stored in the hard disk, but may be stored in a removable recording medium so that it can be read out by the CPU by way of the disk drive or the like. Alternatively, the program module and the program data for the analysis program may be stored in a different computer connected thereto via a network (e.g. local area network (LAN) and wide area network (WAN)) and read out by the CPU via the network interface.

Image Processing Apparatus

According to the above embodiments, the ultrasonic diagnostic apparatus 10 includes the analyzing unit 28a and the analysis result display controller 28b, or the ultrasonic diagnostic apparatus 10 includes the analyzing unit 28a, the analysis result display controller 28b, and the organized-by-direction B-mode image display controller 28c, but the disclosed technology is not limited thereto.

For example, an image processing apparatus 50 that is provided separately from the ultrasonic diagnostic apparatus 10 may perform an analysis onto the echo signals received by the ultrasonic diagnostic apparatus 10 and display the analysis result.

Figure 21:
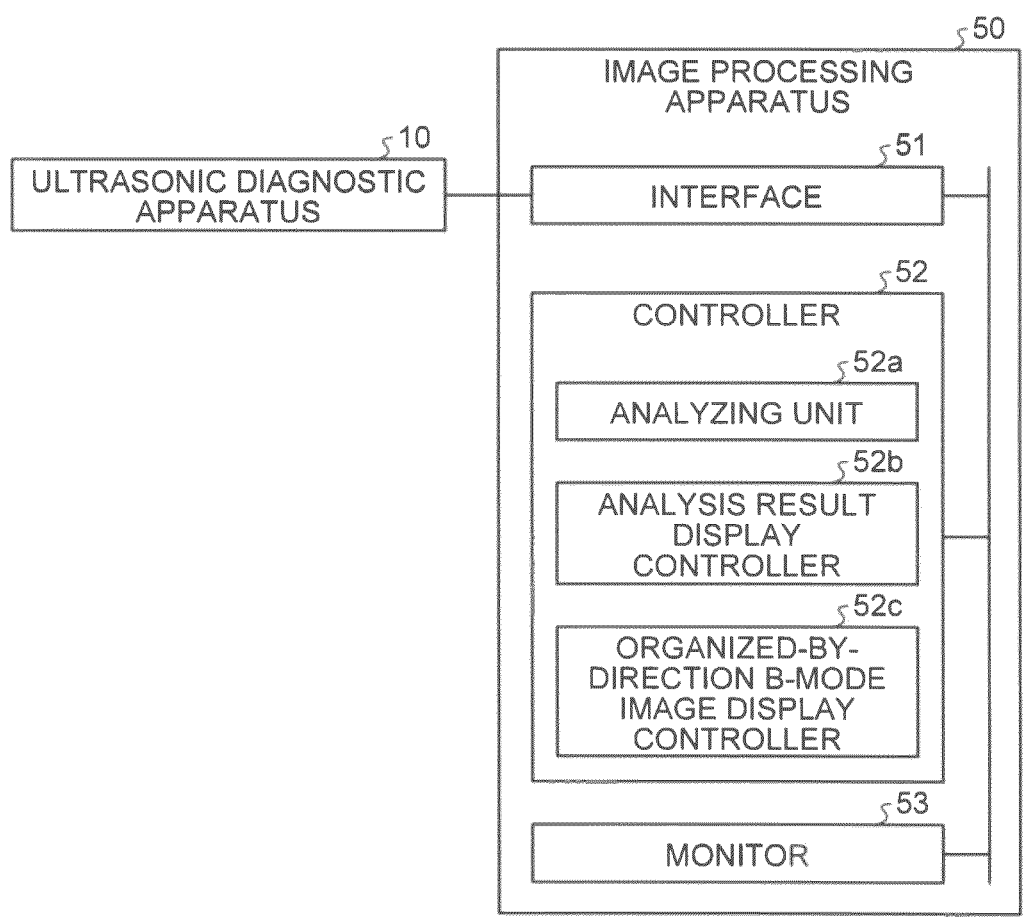
FIG. 21 is a diagram for explaining an example structure according to another embodiment.

FIG. 21 is a diagram for explaining a structure according to another embodiment. As indicated in FIG. 21, according to this embodiment, the ultrasonic diagnostic apparatus 10 transmits ultrasonic beams in multiple directions by way of the ultrasonic probe 12 and receives echo signals of multiple directions by way of the ultrasonic probe 12, in the same manner as the first embodiment. In addition, the ultrasonic diagnostic apparatus 10 generates a tomographic image for each direction of the ultrasonic beams in accordance with the received echo signal, in the same manner as the first embodiment. This tomographic image is sent to the image processing apparatus 50 through a network or the like. Alternatively, the echo signal may be sent to the image processing apparatus 50, and a tomographic image may be generated on the side of the image processing apparatus 50, for each direction of the ultrasonic beams.

On the other hand, the image processing apparatus 50 includes an interface 51, a controller 52, and a monitor 53, as shown in FIG. 21. The interface 51 is an interface for a network, in the same manner as the interface 30 of the ultrasonic diagnostic apparatus 10. In addition, the controller 52 is a processor that controls the entire process in the image processing apparatus 50 in the same manner as the controller 28 of the ultrasonic diagnostic apparatus 10. Furthermore, the monitor 53 displays the analysis result and the like, in the same manner as the monitor 14 of the ultrasonic diagnostic apparatus 10.

The controller 52 includes, as shown in FIG. 21, an analyzing unit 52a, an analysis result display controller 52b, and an organized-by-direction B-mode image display controller 52c. The embodiment is not limited thereto, and the controller 52 may not be provided with the organized-by-direction B-mode image display controller 52c.

The analyzing unit 52a compares echo signals of corresponding spatial positions in multiple tomographic images that are generated for different directions of the ultrasonic beams, and analyzes the tissue characterization of a patient described in the tomographic images. Furthermore, the analysis result display controller 52b displays the analysis result obtained by the analyzing unit 52a onto the monitor 53. Moreover, the organized-by-direction B-mode image display controller 52c lays out and displays multiple B-mode images generated for different directions of the ultrasonic beams onto the monitor 53, or switches and displays one of the B-mode images to another.

Others

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic diagnostic apparatus, comprising:
an ultrasound transmitting and receiving unit configured to transmit ultrasonic beams in a plurality of directions by way of an ultrasonic probe, and receive echo signals of the plurality of directions by way of the ultrasonic probe;
a tomographic image generating unit configured to generate a plurality of tomographic images, one for each of the plurality of directions of the ultrasonic beams, by use of the echo signals;
an analyzing unit configured to compare echo signals of corresponding spatial positions in the generated plurality of tomographic images and perform an analysis based on the comparison to obtain an analysis result; and
an analysis result display controller configured to display the analysis result on a display.

2. The ultrasonic diagnostic apparatus according to claim 1, wherein the analyzing unit is configured to perform the analysis by comparing intensities of the echo signals or brightness levels assigned in accordance with the intensities.

3. The ultrasonic diagnostic apparatus according to claim 1, wherein the analyzing unit is configured to receive designation of a region of interest, and compare echo signals in the region of interest that is designated.

4. The ultrasonic diagnostic apparatus according to claim 1, further comprising a tomographic image display controller configured to display the plurality of tomographic images generated, one for each of the plurality of directions of the ultrasonic beams, by the tomographic image generating unit laying the plurality of tomographic images out on the display or switching from one of the plurality of tomographic images to another.

5. The ultrasonic diagnostic apparatus according to claim 1, wherein:
the analyzing unit is further configured to calculate a difference between brightness levels of pixels of corresponding spatial positions in the plurality of tomographic images, and assign a color in accordance with the difference in the brightness levels that is calculated; and
the analysis result display controller is configured to display a color mapping image in which the color is assigned.

6. The ultrasonic diagnostic apparatus according to claim 1, wherein the analysis result display controller is further configured to calculate a difference between brightness levels of pixels of corresponding spatial positions in the plurality of tomographic images, and display, as the analysis result, a graph that represents a relationship between a difference in angles of the ultrasonic beams and the difference in the brightness levels.

7. An image processing apparatus, comprising:
a tomographic image generating unit configured to generate a plurality of tomographic images, one for each of a plurality of directions of ultrasonic beams by use of echo signals that are received by an ultrasound transmitting and receiving unit configured to transmit the ultrasonic beams in the plurality of directions by way of an ultrasonic probe and receive the echo signals of the plurality of directions by way of the ultrasonic probe;
an analyzing unit configured to compare echo signals of corresponding spatial positions in the generated plurality of tomographic images and perform an analysis based on the comparison to obtain an analysis result; and
an analysis result display controller configured to display the analysis result on a display.

8. The image processing apparatus according to claim 7, wherein the analyzing unit is further configured to perform the analysis by comparing intensities of the echo signals or brightness levels assigned in accordance with the intensities.

9. The image processing apparatus according to claim 7, wherein the analyzing unit is configured to receive designation of a region of interest, and compares echo signals in the region of interest that is designated.

10. The image processing apparatus according to claim 7, further comprising a tomographic image display controller configured to display the plurality of tomographic images generated, one for each of the plurality of directions of the ultrasonic beams, by the tomographic image generating unit laying the plurality of tomographic images out on the display or switching from one of the plurality of tomographic images to another.

11. The image processing apparatus according to claim 7, wherein:
the analyzing unit is further configured to calculate a difference between brightness levels of pixels of corresponding spatial positions in the plurality of tomographic images and assign a color in accordance with the difference in the brightness levels that is calculated; and
the analysis result display controller is configured to display a color mapping image in which the color is assigned.

12. The image processing apparatus according to claim 7, wherein the analysis result display controller is further configured to calculate a difference between brightness levels of pixels of the corresponding spatial positions in the tomographic images and display, as the analysis result, a graph that represents a relationship between a difference in angles of the ultrasonic beams and the difference in the brightness levels.

13. A non-transitory computer readable storage medium comprising instructions that cause a computer to execute:

generating a plurality of tomographic images, one for each of a plurality of directions of ultrasonic beams by use of echo signals that are received by an ultrasound transmitting and receiving unit configured to transmit the ultrasonic beams in the plurality of directions by way of an ultrasonic probe and receive the echo signals of the plurality of directions by way of the ultrasonic probe;

comparing echo signals of corresponding spatial positions in the generated plurality of tomographic images, and performing an analysis based on the comparison to obtain an analysis result; and displaying the analysis result on a display.

14. The storage medium according to claim 13, wherein the analysis is performed by comparing intensities of the echo signals or brightness levels assigned in accordance with the intensities.

15. The storage medium according to claim 13, wherein designation of a region of interest is received, and echo signals in the region of interest that is designated are compared.

16. The storage medium according to claim 13, wherein the plurality of tomographic images generated, one for each of the plurality of directions of the ultrasonic beams are displayed by laying the plurality of tomographic images out on the display or switching from one of the plurality of tomographic images to another.

17. The storage medium according to claim 13, wherein:

a difference between brightness levels of pixels of corresponding spatial positions in the plurality of tomographic images is calculated, and a color is assigned in accordance with the difference in the brightness levels that is calculated; and a color mapping image in which the color is assigned is displayed.

18. The storage medium according to claim 13, wherein a difference between brightness levels of pixels of corresponding spatial positions in the plurality of tomographic images is calculated, and a graph that represents a relationship between a difference in angles of the ultrasonic beams and the difference in the brightness levels is displayed as the analysis result.

* * * * *